United States Patent

[11] 3,615,832

| [72] | Inventors | James P. Malloy |
| | | Cheltenham; |
| | | Ronald R. Nilson, Philadelphia, both of Pa. |
| [21] | Appl. No. | 766,906 |
| [22] | Filed | Oct. 11, 1968 |
| [45] | Patented | Oct. 26, 1971 |
| [73] | Assignee | ESB Incorporated |

[54] METHOD OF EXTRUDING AN ELECTRODE
5 Claims, 8 Drawing Figs.

[52] U.S. Cl. .................................................. 136/27, 264/270
[51] Int. Cl. ............................................... H01m 39/00
[50] Field of Search .......................................... 136/26, 27, 14, 34, 35, 19; 264/270, 104, 71, 72, 269, 312; 117/95

[56] References Cited
UNITED STATES PATENTS

| 2,204,785 | 6/1940 | Bennett ...................... | 264/269 |
| 2,526,174 | 10/1950 | Ukropina ...................... | 264/72 |
| 2,667,664 | 2/1954 | Ferrell ........................... | 264/72 |
| 3,239,005 | 3/1966 | Bodine, Jr. .................... | 264/71 |
| 3,366,718 | 1/1968 | Komada ....................... | 264/269 |

*Primary Examiner*—Winston A. Douglas
*Assistant Examiner*—C. F. Lefevour
*Attorneys*—Alfred J. Snyder, Jr., Robert H. Robinson and Joseph M. Corr

ABSTRACT: A method of extruding an electrode along the inner surfaces of a cylindrical cell container and a cell having such an electrode. A quantity of an electrode active material is placed in the bottom of the container and a rapidly spinning, cruciform-shaped tool is lowered into the container and extrudes the active material along the container walls. The particular application of the method involves forming a gridless lead electrode in the cell container whereby the cell walls support the active material. A modified tool is used for a rectangular cell container wherein the tool is rectangular, having two surfaces recessed from the tool edges so as to form an open space between the container walls and the recessed surfaces. The tool is continually vibrated and when it is lowered into the container, paste is extruded up the open space and is spread along the inner walls of the container while the tool is vibrating.

PATENTED OCT 26 1971 3,615,832
SHEET 2 OF 3
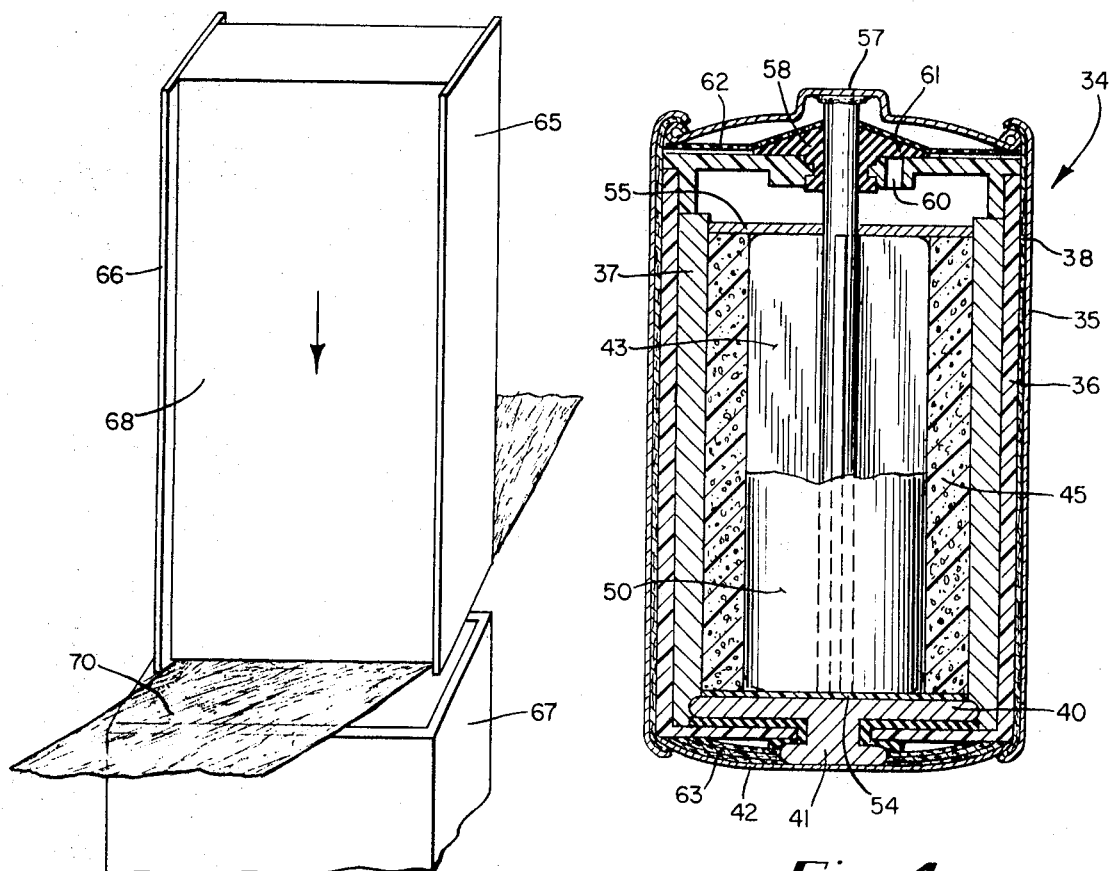
Fig. 6
Fig. 4
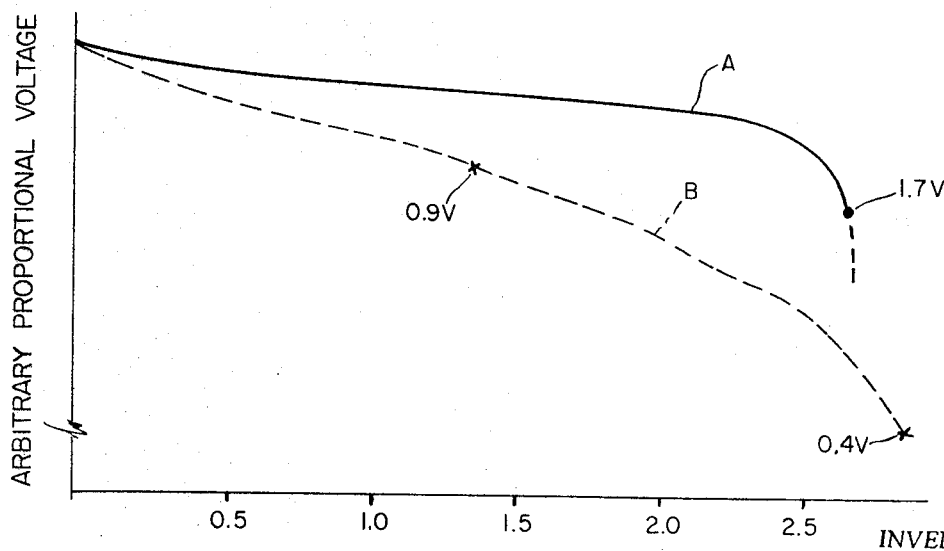
Fig. 5
INVENTORS.
JAMES P. MALLOY
RONALD R. NILSON
BY
ATTORNEY.

PATENTED OCT 26 1971 3,615,832

INVENTORS.
JAMES P. MALLOY
RONALD R. NILSON
BY
ATTORNEY.

METHOD OF EXTRUDING AN ELECTRODE

BACKGROUND OF THE INVENTION

While much of the following discussion refers to lead-acid cells, it is not intended to limit the scope of this invention in any way since the invention is readily applicable to the broad class of cells having at least one electrode made from a paste active material.

The normal method in making an electrode for a lead-acid cell involves spreading the lead-active material in the interstices of a grid which normally is made of lead, a calcium-lead alloy, or other lead alloy. The grid acts as a support and as a current collector for the electrode. Since the grid is made of a heavy material, such electrodes tend to be heavy and therefore it has not been practical to make lead-acid cells having sizes comparable to the conventional LeClanche cells.

It would be desirable to have a method for making a gridless lead electrode so as to reduce significantly the weight of the electrode. Having removed the problem of weight, it is then conceivable to have a lead-acid cell of the size of the conventional LeClanche flashlight cell which would possess the desirable features of rechargeability and good capacity on continuous drains.

In making the conventional LeClanche or alkaline cells under present methods, it is common to pack the active material under pressure into the cell container or to premold the active material and place it into the container. A method whereby the active material can be placed into the container and extruded therein into the shape of an electrode would avoid the two-step manufacturing process of premolding the active material and then placing it into the container. Also, the method of extrusion pasting an electrode is simpler than packing the active material into the container.

SUMMARY OF THE INVENTION

The primary purpose of this invention is to provide a method of extruding and spreading a uniform electrode in a cell container. In achieving this object, the further object of providing a cell wherein the cell container walls serve as the supporting structure for a gridless electrode is accomplished. Also, in achieving this basic purpose, it is intended to provide a properly designed extrusion tool in order to minimize surface contact and friction between the tool and the electrode material that is extruded. With such a design of the tool, rapid rotation thereof prevents loose particles of the electrode material from adhering to the tool and the paste is extruded and spread in a uniform manner.

It is an additional object of the invention to have a method of making a gridless lead electrode. A further object is to have a lead-acid cell utilizing such a gridless electrode. Since this invention provides a method of making a gridless lead electrode, the object of providing a cheaper electrode is accomplished since the manufacturing steps performed in making electrode plates with grids are avoided.

Another object of the invention is to provide a method for extruding an electrode in either a cylindrical or rectangular cell container. This invention provides a cylindrical, cruciform tool for use in extruding electrodes in cylindrical containers and provides a rectangular-shaped tool which extrudes an electrode in a rectangular container.

The method of this invention lies in placing a weighed amount of electrode material in the bottom of a container and extruding the material into a shaped electrode. If the container is cylindrical, a rotating, cylindrical, cruciform-shaped tool is lowered into the container and upon contacting the electrode paste extrudes the paste up the container walls by volume displacement and uniformly spreads the paste along the container walls. The diameter of the tool is less than the inner diameter of the cell container. If the container is rectangular, then a solid rectangular tool with two of its surfaces recessed from the tool edges is lowered into the container and vibrated therein. The other two surfaces of the tool are flush against the adjacent surfaces of the container. The tool contacts the electrode paste and extrudes it up in the space which exists between the walls of the container and the recessed surfaces of the tool. The tools are rotated and vibrated, respectively, throughout the extrusion operation and as they are withdrawn from the container. A thin sheet of fiberglass is placed between the recessed surfaces of the rectangular tool and the electrode paste in order to prevent the latter from adhering to the tool.

With either method, a cell having a gridless electrode made of lead or other suitable material is provided.

BRIEF DESCRIPTION OF THE DRAWINGS

FIG. 4 is a cell of this invention in cross section having the container and extruded electrode shown in FIG. 2.

FIG. 5 is a graph illustrating the comparative watt hour capacities of a "D" size cell of this invention and a conventional "D" size LeClanche dry cell.

FIG. 6 illustrates the tool used in extruding an electrode in a rectangular cell container.

DESCRIPTION OF THE PREFERRED EMBODIMENTS

As noted previously this invention is not to be limited to lead-acid cells since the method can easily be used to form electrodes from gellike active materials for other cell systems.

Figure 1:
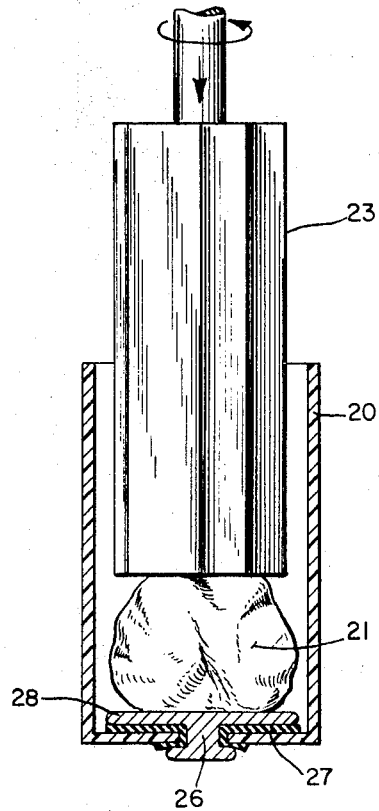
FIG. 1 is a schematic drawing of a cylindrical cell container having a weighed amount of electrode material in the bottom and there is shown a rotating cruciform-shaped tool being lowered into the container for extruding the electrode material along the inner surfaces of the container.

Referring to Figure 1 there is shown in cross section a nonconductive cell container 20 which is opened at one end. In the bottom of the container there is a preweighed amount of paste lead active material 21. Located above the active material is a cruciform-shaped tool 23 which in operation is rotated while at the same time lowered into the cell container to contact the active material as indicated by the arrows. The cell container is shown as made of plastic, such as high-impact polystyrene, and sealed in the bottom thereof is a lead rivet-shaped terminal 26 which serves as a contact point for the electrode. Other container materials include polyethylene, polypropylene and ABS rubber material. A rubber grommet 27 is used to seal the rivet in the container and to prevent electrolyte leakage around the rivet. The terminal 26 has a flat surface 28 which is shown lining the bottom of the container with the active material placed thereon. This flat surface serves as the current collector for the electrode after it is extruded into shape. If the container were made of metal or other conductive material instead of plastic it itself could serve as the current collector and contact point, or if desirable the plastic container could be molded around the terminal which would serve as the contact point.

The tool 23 extrudes and spreads the active material as it is lowered into the container and comes into contact with the active material. By volume displacement the tool extrudes the active material up the sidewalls of the container and due to its rapid rotation and its cruciform shape, the tool spreads the active material uniformly over the inner surfaces of the sidewalls. Subsequent to this operation the electrode is formed into a negative electrode which has the unique quality of being gridless.

Figure 2:
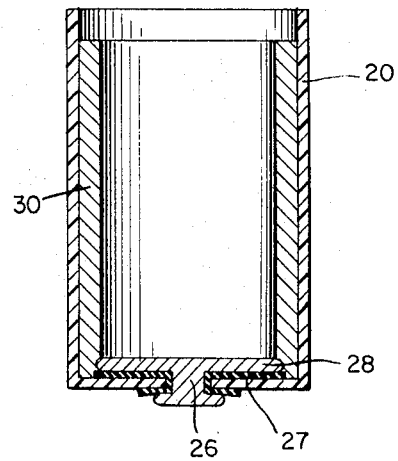
FIG. 2 is a schematic drawing showing a gridless electrode extruded along the inner surfaces of a cylindrical cell container.

In FIG. 2, there is shown the plastic cell container 20 of FIG. 1 with an electrode made according to the teaching of this invention.

The active material which had been in the bottom of the container in FIG. 1 has been extruded by the tool 23 into a gridless electrode 30. The plastic container 20 has the terminal 26 passing through its bottom with the current collector 28 lining the bottom of the container. Along the sidewalls of the container a gridless lead electrode 30 has been extruded and spread. Even though this lead electrode has no grid, it has structural integrity and will not fall away from the supporting sidewalls but will maintain its shape without further support. Formation of the electrode takes place after the active material has been extruded and spread along the container walls. Although the electrode has been extruded using the spinning tool, the top edge of the electrode is flat which is achieved as a result of placing a collar down onto the open end of the container so as to form a rim around the inside of the container. The spinning tool is then lowered into the container through the hole in the collar and extrudes the electrode along the container walls up to the rim formed by the collar. The rim then acts to "square off" the top edge of the electrode. If desired, the spinning tool can be designed to have a flange or other modification to flatten the top edge of the electrode.

Figure 3:
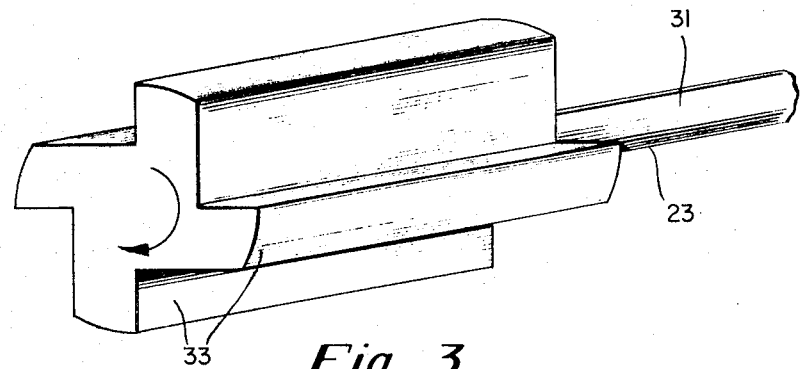
FIG. 3 is a drawing of the cruciform-shaped tool shown in Figure 1 and which was used to extrude the electrode shown in Figure 2.

In FIG. 3, there is shown a tool 23 that has been used to extrude the electrode in FIG. 2 and which was shown suspended in the container in FIG. 1. The tool comprises a cylindrical shaft 31 with a plurality of blades or paddles 33 extending outwards giving the tool its cruciform shape at the one end. The arrows indicate the direction that the tool is normally spun so that the blades can easily and evenly spread the active material along the surfaces of the container. Dye to the cruciform shape of the tool, loose excess particles of the active material are able to collect in the channels formed between the paddles 33 and can easily be removed from the container as surplusage. The length of the paddles 33 are preferably slightly greater than the height of the cell container 20 in FIG. 1. While aluminum has been used successfully for this tool, other materials are suitable, such as Teflon-clad stainless steel.

In FIG. 4 there is shown in cross section an assembled lead-acid cell 34 having an electrode made according to this invention and comprises an outer metal jacket 35 around a plastic container 36 with a negative electrode 37 extruded along the sidewalls of the container and in contact with a current collector 40 shown in the bottom of the container. A paper insulator 38 is shown along the inner surface of the metal jacket 35. A terminal 41 which is integral with the current collector serves as the contact point between the negative electrode and the metallic contact plate 42 shown crimped under the outer jacket 35 and insulator 38.

A tubular separator 45 is shown sealed at the bottom by a polyethylene sheet 54 and at the top by a fiber glass mat 55. Both the polyethylene sheet and the fiberglass mat have been heat sealed to the separator. The positive electrode which is contained in the separator and comprises a flanged current collector 43 embedded in lead oxide ($Pb_3O_4$) 50 which substantially fills the interior of the tubular separator 45. The separator is preferably a microporous thermoplastic material, such as polyethylene, which has an exceptionally large pore volume wherein sugar has been used as a pore-forming agent in making the separator. This separator material and the method of making it is described in greater detail in U.S. Pat. No. 3,375,208. Other separator materials include microporous plastics and plastic-mineral compositions.

The positive current collector 43 passes through the sheet of fiber glass mat 55 which permits gas to escape from inside the positive electrode while keeping the lead oxide active material within the interior of the tubular separator. The positive current collector 43 passes through an umbrella-type vent valve 58 and contacts the cap 57 which acts as the terminal for the positive electrode.

Venting of the cell occurs when gases pass through the vent hole 60 slightly raising the overhanging section 61 of the umbrella valve and flow to the periphery of the cap to escape to the atmosphere around the rolled edge of the cap which is crimped under the edge of the outer casing 35. Layers of absorbent material 62 and 63 are shown at the top and bottom of the cell. This absorbent material is provided to soak up any electrolyte that might leak from the cell. Blotting paper or other suitable absorbent material may be used for this purpose.

In FIG. 5 there is shown a graph which compares the watt hour capacities of a "D" size lead-acid cell made according to this invention and a conventional "D" size LeClanche cell. The watt hour capacity is shown for a constant drain of 250 milliamperes and an arbitrary proportional voltage scale is used to avoid the problem presented by the fact that these two types of cells have different voltages. Curve A corresponds to the values for a lead-acid cell of this invention and Curve B corresponds to a conventional LeClanche cell. The cell made according to this invention has a discharge curve flatter than the conventional LeClanche cell and has a considerably greater watt hour capacity in addition to being rechargeable. Several potential points have been marked on the curves to give a more quantitative meaning to the curves and to illustrate the higher capacity of a cell of this invention. These are important advantages over the conventional LeClanche cell achieved by the cell of this invention.

In FIG. 6 there is shown a rectangularly shaped tool or plunger 65 which is used in extruding an electrode in a rectangular container. The tool is about to be lowered into a rectangular container the upper portion of which is shown as 67 and in which there is a preweighed amount of active material not shown in the Figure but which has been placed in the bottom of the container similarly as in Figure 1. The tool has two of its surfaces recessed approximately one-sixteenth inch from its edges so that as the tool is lowered into the container the recessed surfaces are approximately one-sixteenth inch distant from the sidewalls of the container. One of the recessed surfaces is shown at 68 and the second recessed surface is on the side of the tool opposite surface 68. As the tool is lowered into the container it is continuously vibrated and pushes ahead of it a fiber glass sheet 70 which has been placed across the open end of the container and which lines the recessed surfaces and the bottom of the tool as it lowers into the container. The purpose of the fiber glass sheet is to prevent any active material from sticking to the surface of the tool. Woven polyester fabric, felt or other microporous separator materials may be used in place of the fiber glass. As the vibrating tool comes into contact with the active material it extrudes the active material up into the space between the recessed surfaces of the tool and the inner wall of the container so that the active material is spread along the bottom and two walls of the container. A terminal is provided in the bottom of the container as a contact for the electrode. The tool is continuously vibrated during this time to aid in extruding the active material along the inner sidewalls of the container. Again this tool can be made of aluminum or Teflon-clad stainless steel or other suitable material and essentially fills the container, leaving room to permit vibration in the container. When the tool is removed from the container, the fiber glass sheet remains in the container lining the extruded electrode.

Figure 7:
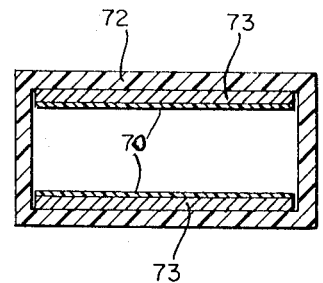
FIG. 7 is a cross-sectional view of a rectangular container having an electrode extruded along two inner walls using the tool shown in FIG. 6.

In FIG. 7 there is shown in cross section a plastic cell container 72 with lead active material extruded inside along two walls into the shape of an electrode at 73. The electrode has been extruded and spread by the vibrating tool shown in FIG. 6 and in practice measures approximately one-sixteenth inch in thickness. The fiber glass sheet 70 is pressed against the electrode by the vibrating tool and remains in place after the tool has been removed as is evident in FIG. 7.

Figure 8:
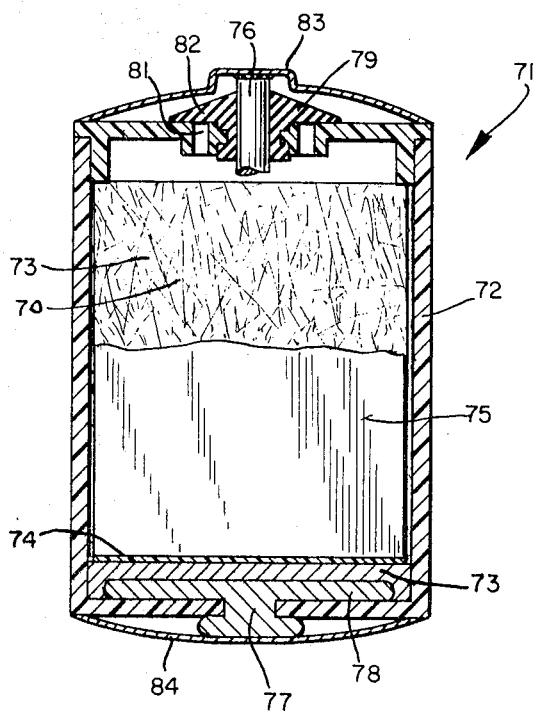
FIG. 8 is a sectional view in elevation of an assembled rectangular cell having an electrode extruded along a wall of the cell container.

In FIG. 8 there is shown a cross-sectional view of an assembled rectangular battery 71 which has an electrode extruded along its walls using the technique of this invention. The plastic cell container is shown at 72 and has a lead terminal 77 passing through its bottom. The container is preferably made of a high-impact polystyrene material although other suitable plastics could be used. The negative lead electrode 73 is shown extruded and spread along the backwall of the container 72 and a thin layer of the electrode is shown along the flat surface 78 of the negative terminal 77. This surface 78 serves as the current collector for the negative electrode. The fiber glass sheet which has been interposed between the vibrating tool and the negative active material is shown at 70 as being pressed against the extruded electrode, and is shown in cross section above the layer of the electrode covering the current collector 78.

A portion of the positive electrode is shown at 75. The electrode has been broken away in order to reveal the negative electrode 73 extruded along the backwall of the container. This electrode is a conventional pasted grid electrode and the grid has a terminal current collector 76 at its top. The current collector 76 is shown passing through a rubber umbrella-type vent valve 79 which is shown seated in a hole of the top 80 of the cell container. Vent holes 81 and the overhanging section 82 of the vent valve cooperate in venting gases from the cell in the same manner as related above in the discussion of Figure 4. The positive electrode is surrounded by an envelope of Porvic separator material 74 which is open at its top.

Soldered to the positive current collector 76 is a metal contact plate 83 and similarly soldered to the negative terminal 77 is a metal contact plate 84. These plates serve as the contact points for the respective electrodes to an external circuit and can be made of any suitable metal such as tin.

EXAMPLE I

The following table lists the average values of capacities in milliampere-hours for five cylindrical "D" size cells made according to this invention and tested at the current drains shown in the table. The cells were constructed like the cell shown in cross section in Figure 4 and each comprised a positive electrode of about 25 grams of lead oxide, a negative electrode of about 40 grams of lead which was extruded according to this invention, and about 20 grams of a acid electrolyte of 1.325 specific gravity. The extruding tool was rotated at 1,920 r.p.m. in extruding the negative electrode of each cell along the walls of the container. The electrode was approximately three thirty-seconds inch thick. The formation of the positive electrode required a formation current resulting in 300 ampere hours per pound of electrode material, while the negative electrode required 200 ampere hours per pound for formation. The electrolyte used in the forming process was a sulphuric acid solution of 1.04 to 1.05 specific gravity.

| Current Drain (Amps) | Capacity (Amp-Hrs.) |
|---|---|
| 1.50 | 0.80 |
| 1.00 | 1.05 |
| 0.50 | 1.20 |
| 0.26 | 1.42 |
| 0.10 | 1.60 |

It is apparent from the above table that a lead-acid cell made according to this invention has very favorable capacities at these discharge rates. Thus, due to the method of this invention, it is now possible to provide a rechargeable lead-acid cell which is an excellent alternative to the conventional LeClanche cell in some instances.

In addition to being applicable in making lead-acid cells, the method of this invention may easily be used in making other secondary or primary cells. If the physical properties of an electrode active material permit it to be extruded, then the method of this invention is applicable for extruding this active material into an electrode in a cell.

The scope of the invention described herein will be readily apparent to those skilled in the art and it is intended to encompass all modifications falling within the spirit and teaching of the invention. For example, in describing Figures 6, 7 and 8 it is not intended to limit the invention to rectangular containers and tools since the method is applicable in extruding electrodes in triangular, hexagonal and other shaped containers which can generally be classed as prismatic in shape.

What we claim is:

1. A method for extruding a battery electrode along the sidewall and bottom of an electrochemical cell container open at the top end wherein said sidewall supports the active material of said battery electrode, comprising placing a quantity of lead-acid battery active material paste in the bottom of said container sufficient to cover said sidewall, lowering a spinning, cylindrical cruciform-shaped tool into said container and into contact with said active material, said spinning tool having a plurality of paddles substantially equal in length to the height of said container, extruding and spreading said active material by volume displacement substantially evenly along the sidewall and bottom of said container while said tool is spinning in contact with said active material, loose excess active material particles collecting in channels formed between the paddles withdrawing said spinning tool upon which any excess active material has collected between said paddles after said active material has been spread along said container sidewall and bottom between said cruciform-shaped tool and said container, and forming said active material into a gridless negative electrode. forming said active material into a gridless negative electrode.

2. A method in accordance with claim 1 in which a collar is placed onto the open end of said container to form a rim around the inside of said container, said spinning cruciform-shaped tool is lowered into said container through the hole in said collar, and said active material is extruded along said container sidewall up to the rim formed by said collar.

3. A method for extruding a battery electrode along at least one sidewall and bottom of a rectangular cell container having four sidewalls and open at the top end wherein said sidewall supports the active material of said battery electrode, comprising placing a quantity of lead-acid battery active material paste in the bottom of said container sufficient to cover said sidewall, lowering a vibrating rectangular plunger tool into said container and into contact with said active material, said plunger tool substantially filling said container and having at least one surface recessed from the adjacent sidewall of said container, said recessed surface having longitudinal ribs at its edges extending the length of said recessed surface, said recessed surface of said plunger tool is covered with a sheet material before it contacts said active material to prevent said active material from sticking to said recessed surface, and said sheet material remains in said container covering said extruded electrode when said plunger tool is withdrawn from said container, said active material being extruded and spread by volume displacement between said recessed surface and said adjacent sidewall, withdrawing said vibrating plunger tool after said active material has been spread along said container sidewall and bottom, and forming said active material into a gridless negative electrode.

4. A method in accordance with claim 3 in which said plunger tool has two recessed surfaces which are located on opposite sides of said plunger tool.

5. A method in accordance with claim 3 in which said sheet material is fiber glass.

* * * * *